United States Patent
Chiu et al.

(10) Patent No.: US 6,781,473 B1
(45) Date of Patent: Aug. 24, 2004

(54) HIGH-SPEED LOW-POWER IMPLEMENTATION FOR MULTI-CHANNEL NUMERICALLY CONTROLLED OSCILLATOR (NCO)

(75) Inventors: John S Chiu, Hayward, CA (US); Roger Stenerson, Sunnyvale, CA (US); Sricharan Kasetti, Santa Clara, CA (US); WeiMin Zhang, San Jose, CA (US)

(73) Assignee: BroadLogic Network Technologies, Inc., San Jose, CA (US)

( * ) Notice: Subject to any disclaimer, the term of this patent is extended or adjusted under 35 U.S.C. 154(b) by 0 days.

(21) Appl. No.: 10/242,947

(22) Filed: Sep. 13, 2002

Related U.S. Application Data
(60) Provisional application No. 60/322,279, filed on Sep. 14, 2001.

(51) Int. Cl.[7] .............................................. H03B 21/00
(52) U.S. Cl. .................. 331/177 R; 331/179; 327/105; 327/106; 327/107
(58) Field of Search ............................. 331/177 R, 179; 327/105–107

(56) References Cited

U.S. PATENT DOCUMENTS
6,320,431 B1 * 11/2001 Potson et al. ............... 327/106

* cited by examiner

Primary Examiner—David Mis
(74) Attorney, Agent, or Firm—Townsend and Townsend and Crew LLP

(57) ABSTRACT

Method and apparatus for generating sinusoidal signals in quadrature. A numerically controlled oscillator includes a phase accumulator configured to generate a periodic multi-bit signal at a given frequency; a first memory configured to store an octant of a sinusoidal waveform; a second memory configured to store a complementary octant of the sinusoidal waveform; and a control circuit, responsive to at least a portion of the phase accumulator signal and coupled to the first and second memories, the control circuit configured to access the first and second memories in parallel and construct respective sine and cosine waves at the given frequency.

29 Claims, 18 Drawing Sheets

HIGH-SPEED LOW-POWER IMPLEMENTATION FOR MULTI-CHANNEL NUMERICALLY CONTROLLED OSCILLATOR (NCO)

CROSS-REFERENCES TO RELATED APPLICATIONS

This application claims priority to U.S. Provisional Application No. 60/322,279, titled "HIGH-SPEED/LOW-POWER IMPLEMENTATION FOR MULTI-CHANNEL NCO," filed Sep. 14, 2001, incorporated herein by reference for all purposes.

BACKGROUND OF THE INVENTION

This application relates generally to signal synthesis and more specifically to generating sinusoidally varying signals, such as sine and cosine wave signals, using a numerically controlled oscillator.

Numerically controlled oscillators (NCOs) are commonly employed in electronic systems requiring periodic signal references. Modulators and demodulators are examples of electronic systems that often require periodic signals and periodic signal generators, such as NCOs. Modulation includes processes in which an information signal is superimposed onto a carrier wave, such as a sinusoidally varying signal generated by an NCO. Well known analog modulation techniques include, for example, amplitude modulation (AM), frequency modulation (FM), and phase modulation (PM) among others. Well known digital modulation techniques include, for example, pulse amplitude modulation (PAM) and pulse width modulation (PWM) among others. Once modulated, carrier waves are transmitted to a receiver; at the receiver location, the information signal superimposed onto the carrier wave is extracted via a demodulation process in a demodulator. Demodulators often use periodic signals generated by NCOs as reference signals for locking onto the carrier wave during a demodulation process.

FIG. 1 is a simplified schematic of a known communication demodulator 100 incorporating an NCO 115, which generates a periodic signal used in a demodulation process. As shown, communication demodulator 100 receives a modulated data signal 120 carrying an information signal. The periodic signal generated by the NCO 115 and the modulated data signal are each received by a mixer-multiplier circuit 125 that separates the information signal from the modulated data signal 120. The output of the mixer-multiplier 125 is transmitted to a filter circuit 130 that filters out the carrier wave and outputs an information signal 135 (i.e., demodulated data).

FIG. 2 is a simplified schematic of NCO 115, showing the NCO in greater detail. NCO 115 is of a type commonly known and used in industry, and has numerous shortcomings that will be discussed. The NCO 115 includes a phase accumulator 205 for generating numerical sequences, such as memory addresses. In the phase accumulator a fixed number, called a phase increment 210, is summed with a delayed feedback number 215. The delayed feedback number 215 is controlled by a delay circuit 220 (e.g., a flip-flop) that clocks the delayed feedback number 215 into a modulo N adder 225. A system clock 230 provides clock pulses to the delay circuit for delaying the feedback. The numerical sequence output from the phase accumulator is then mapped to the desired periodic signal 235 (i.e., sine wave/sinusoidal signal) by peripheral logic 245 using a look-up table implemented in a memory 240, such as a read only memory (ROM). The memory 240 is configured to store a quarter of sine wave 235 in order to reduce memory size.

FIG. 3A shows a sine wave divided into quarter portions, such as those stored in memory 240. Although the memory 240 stores an incomplete sinusoid, peripheral logic 245 (see FIG. 2) provides for the full cycle of the sinusoid to be constructed. Consequently, the NCO is able to generate a single sinusoidal signal 235 as the desired output.

An additional signal, such as a quadrature signal (90° out of phase), according to known NCO designs, requires a redundant memory for storing another sine wave quadrant and redundant peripheral logic for manipulating the other quadrant. FIG. 3B shows first and second sinusoidal signals 300 and 305. Sinusoidal signal (i.e., sine wave) 305 is said to be in quadrature with, or to be the quadrature signal of sinusoidal signal (i.e., cosine wave) 300.

FIG. 4 is a simplified schematic of a typical NCO 405 providing two sinusoidally varying signals 235a and 235b, with signal 235b being the quadrature signal of signal 235a. In order to generate the two signals, NCO 405 includes two memories 240a and 240b, and two peripheral logic circuits 245a and 245b. It is noted that a numeral scheme similar to that used in FIG. 2 is used for similar features shown in FIG. 4. Since NCO 405 requires redundant circuitry to generate the two signals 235a and 235b, the footprint (area occupied on a semiconductor chip) of the NCO 405 is relatively large. Alternatively, an additional output (i.e., signal 235b) may be generated with additional time-multiplexing circuitry (not shown), which tends to be costly and slow. For example, generating two sinusoidally varying signals from a single sinusoidally varying signal using time multiplexing techniques takes at least twice the amount of time required to generate a single sinusoidally varying signal. Further yet, known NCO 500 (see FIG. 5) providing multiple pairs of channel outputs 510 (each pair is labeled with a numerical suffix), require a pair of memories 520 (each pair is labeled with a numerical suffix) for each pair of channel outputs. Such NCO configurations requiring redundant systems and circuits are relatively costly to implement in multi-channel modulation and/or demodulation systems.

As can be understood from the above discussion, conventional NCOs use relatively large memories having relatively large footprints and relatively high cost to implement look-up tables for storage of quarter sine waves. Further, known multi-channel NCO designs add extra cost due to the use of redundant circuits. Accordingly the industry continues to strive to create low gate count (i.e., small footprint, low cost, low circuit redundancy), multi-channel NCOs for signal synthesis as well as other applications.

SUMMARY OF THE INVENTION

The present invention provides methods and apparatus for multi-channel output NCOs that do not engender the problems described above. NCOs characteristic of the present invention provide for reduced memory size and streamlined logic for implementing a high-speed and lower-power design with multi-channel outputs.

In accordance with an aspect of the present invention, a numerically controlled oscillator (NCO) comprises a phase accumulator configured to generate a periodic multi-bit signal at a given frequency; a first memory configured to store an octant of a sinusoidal waveform; a second memory configured to store a complementary octant of the sinusoidal waveform; and a control circuit, responsive to at least a portion of the phase accumulator signal and coupled to the first and second memories, the control circuit configured to access the first and second memories in parallel and construct respective sine and cosine waves at the given frequency. The invention can also be used to generate periodic waveforms other than sinusoidal, so long as the waveform has the symmetry property that the entire waveform can be reconstructed from a pair of complementary octants.

In some embodiments, the control circuit includes a memory address generator, responsive to a first subset of bits from the phase accumulator signal, configured to generate addresses for said first and second memories, said addresses providing for access in a normal sequence of increasing numerical values or access in a reverse sequence of decreasing numerical values; an octant-selector circuit, responsive to a second subset of bits from the phase accumulator signal, the octant-selector circuit being connected to receive outputs from the first and second memories and configured to use one of the first and second memory outputs to construct an unsigned-sine wave and to use the other of the first and second memory outputs to construct an unsigned-cosine wave; and a selective-negation circuit, responsive to a third subset of bits from the phase accumulator signal, the selective negation circuit being connected to receive the unsigned-sine wave and the unsigned-cosine wave from the octant-selector circuit and configured to generate the sine wave and the cosine wave therefrom.

In accordance with an aspect of the present invention, a method of operating a numerically controlled oscillator comprises generating a set of memory addresses and at least first, second, and third control bits in a phase accumulator, transmitting the memory addresses to first and second memories; storing in the first memory an octant of a sine wave; storing in the second memory another octant of a sine wave that is complementary to the octant stored in the first memory; transmitting from the first memory the octant in normal order or reverse order, transmitting from the second memory the other octant in normal order or reverse order; receiving the octant and other octant in a octant-selector circuit; outputting from the octant-selector circuit an unsigned-sine wave and an unsigned-cosine wave; and generating from the unsigned-sine wave and unsigned-cosine wave a sine wave and a cosine wave, respectively in a selective-negation circuit.

In some embodiments, the memory addresses are generated in ascending order and descending order; the first memory outputs the octant in normal order or reverse order in response to receiving the memory addresses in ascending order or descending order; and the second memory outputs the octant in normal order or reverse order in response to receiving the memory addresses in ascending order or descending order.

In accordance with an aspect of the present invention, a multi-channel numerical control oscillator comprises a plurality of phase accumulators configured to generate a plurality of memory addresses and a plurality of control bits; a multiplexer coupled to the plurality of phase accumulators, the multiplexer configured to receive output from the phase accumulators, and to selectively transmit the output of one of the phase accumulators; a channel select coupled to the multiplexer, the channel select configured to deliver a channel select signal to the multiplexer for controlling the multiplexer selective transmission; first and second memories coupled to the multiplexer, the first and second memories configured to receive memory addresses transmitted by the multiplexer, the first memory configured to store an octant of the sine wave, the second memory configured to store another octant of the sine wave, wherein the octants are complementary; a control circuit coupled to the first and second memories, the control circuit being configured to receive the octant from the first memory, to receive the other octant from the second memory, to construct a sine wave and a cosine wave, and selectively output to a first output one of the sine wave and the cosine wave and output to a second output the other of the sine wave and cosine wave; and a register back coupled to the control circuit, the register bank configured to receive the sine and cosine waves and selectively fan out the signal to a plurality of output channels, wherein the channel select is configured to deliver the channel select signal to the register bank for controlling selective fan out.

In accordance with an aspect of the present invention, a method of operating a numerically controlled oscillator comprises storing an octant of a sine wave; storing another octant of a sine wave that is complementary to the octant; generating a first set of memory addresses in ascending order, a second set of memory addresses in descending order, and a set of at least three control bits; transmitting the first or second memory addresses in response to one of the control bits; generating the octant and the other octant in normal or reverse order in response to receiving the first set of memory addresses or the second set of memory addresses; generating an unsigned-sine wave and an unsigned-cosine wave in response to receiving two of the control bits; and generating from the unsigned-sine wave and unsigned-cosine wave a sine wave and a cosine wave in response to the control bits.

A further understanding of the nature and advantages of the present invention may be realized by reference to the remaining portions of the specification and the drawings.

DETAILED DESCRIPTION OF THE INVENTION

Introduction

The following description sets forth embodiments of a numerical control oscillator (NCO) for signal synthesis as well as other applications utilizing periodic signals having a particular symmetry property. The description is in terms of sinusoidal signals, since they are the signals most commonly generated by NCOs. However, for purposes of this application, the term sinusoidal should be understood to refer to a broader class of waveforms that have the symmetry property that a full period can be reconstructed from a pair of complementary octants.

Embodiments of the present invention may be applied to analog and digital modulators and demodulators commonly used in the communication industries, such the telephone industry, television, radio, Internet, local area networks, wide area networks, and cellular communication industries just to name a few. While the invention has been characterized as being of use for communications, the invention is of use in a variety of applications having a source that provides sinusoidally varying signals.

Figure 6:
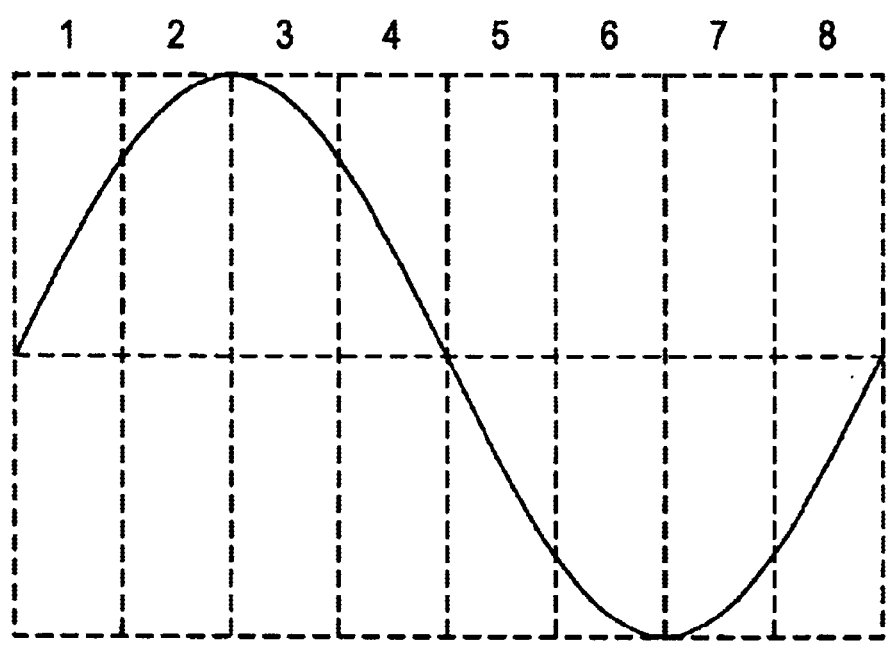
FIG. 6 is a diagram showing a sine wave divided into octant sections, which are labeled by the numbers 1–8.

NCOs, according to embodiments of the present invention, generate pairs of sinusoidally varying signals by storing and manipulating complementary octants of a sine wave. FIG. 6 is a diagram showing a sine wave divided into octant sections, which are labeled by the numbers 1–8. As is well known, the sine wave substantially approximates a straight line in the region immediately around 0, and substantially approximates a parabola in the region immediately around $\pi/2$ (90 degrees). Accordingly, some octants are generally linear while others are generally crescent shaped, and will sometimes be referred to that way. To provide clarity to the present discussion, octants will be referred to herein using the number scheme shown in FIG. 6. Two octants are referred to as complementary octants, or simply complementary, if a full sine wave cycle may be constructed/generated from a set of two operations performed on the octants. The operations include: 1) vertical inversion or flip of an octant (reflection through a horizontal axis), also referred to herein as negating an octant and 2) horizontal inversion or flip of an octant (reflection through a vertical axis).

Figure 7:
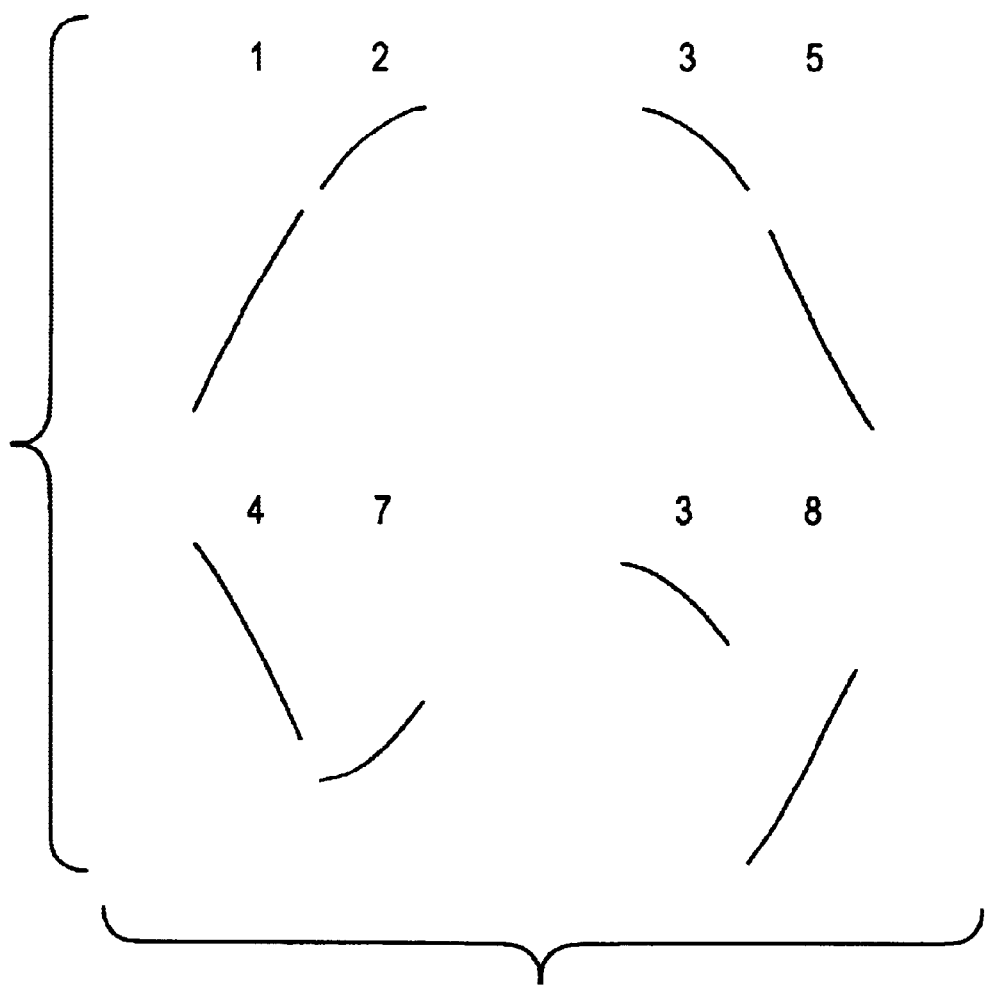
FIG. 7 is a diagram of various pairs of complementary octants according to the present invention.

FIG. 7 is a diagram of various pairs of complementary octants according to the present invention. The pairs of complementary octants shown in FIG. 7 include, the octant pairs 1 and 2, 3 and 5, 4 and 7, and 3 and 8. Thus each octant pair includes a "linear" octant and a "crescent" octant. While FIG. 7 shows a limited number of complementary octants, it should be understood that other complementary octant pairs of a sine wave exist. Taken as an example, octants 1 and 3 are complementary octants from which a full cycle of a sine wave may be generated under the above set of operations. Octant 1 may be used to generate octants 4, 5, and 8. More specifically, octant 1 upon horizontal inversion yields octant 4, upon vertical inversion yields octant 5, and upon both horizontal and vertical inversion yield octant 8. Similarly, octant 3 upon horizontal inversion yields octant 2, upon vertical inversion yields octant 7, and upon horizontal and vertical inversion yields octant 6. As all eight octants may be generated from two complementary octants, the eight octants may then be arranged to form a full cycle of a sine wave or alternatively a full cycle of a cosine wave. A cosine wave can be formed because any two octants that are complementary for a sine wave are also necessarily complementary for a cosine wave.

According to an embodiment of the present invention, each sine wave octant is mapped to a unique binary number. The binary numbers are derived from the three most significant bits of the output from the phase accumulator. Table 1 below shows a binary-octant mapping in which octants 1–8 are mapped to binary numbers 000–111.

TABLE 1

| Phase Accumulator (Upper Three MSBs in binary) | Octant (in decimal) |
| --- | --- |
| 000 | 1 |
| 001 | 2 |
| 010 | 3 |
| 011 | 4 |
| 100 | 5 |
| 101 | 6 |
| 110 | 7 |
| 111 | 8 |

According to embodiments of the present invention, each binary number associated with an octant is used as a basis for making logical decisions whether an octant is to be horizontally inverted, vertically inverted, or both horizontally and vertically inverted to generate another octant. For example, the least significant bit is used to decide whether an octant is to be horizontally inverted to generate another octant, and the most significant bit is used to decide whether an octant is to be vertically inverted to generate another octant. Say for example, octant 1 is to be used to generate octant 4. The binary number associated with octant 4 may be used to indicate whether octant 1 is to be horizontally or vertically inverted to generate octant 4. For example, for octant 4, the least significant bit of the associated binary number being a 1 is used to signal that octant 1 is to be horizontally inverted to generate octant 4 and the most significant bit being a 0 is used to signal that octant 1 is not to be vertically inverted to generate octant 4. Further, an XOR operation of the middle bit and the most significant bit are used to indicate whether an octant is to be vertically inverted. XOR logic operations of these bits are used, for example to generate a cosine wave in quadrature with a generated sine wave. These and other logical uses of the binary numbers associated with the octants will be further explained below in the detailed descriptions of various NCO embodiments of the present invention.

Dual-Channel Numerically Controlled Oscillator

Figure 1:
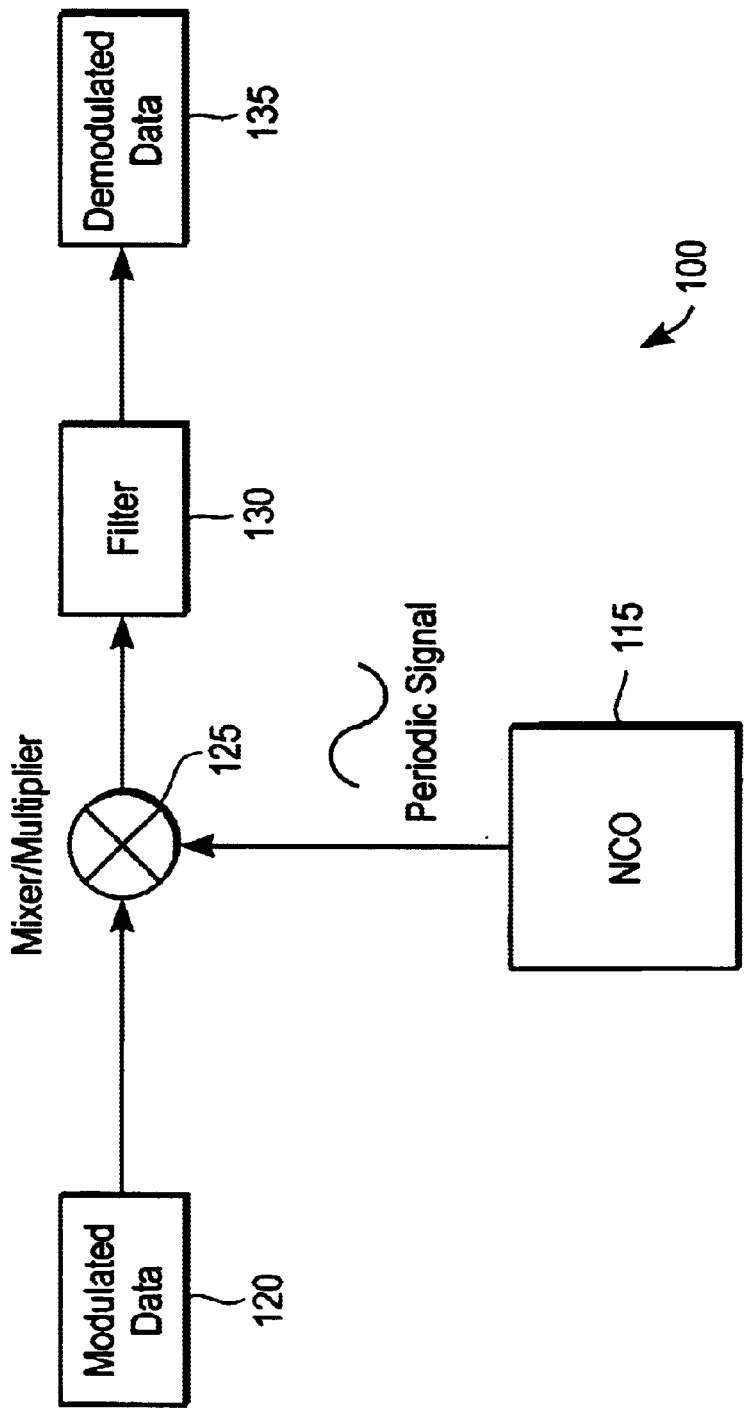
FIG. 1 is a simplified schematic of a typical communication demodulator incorporating an NCO, which generates a periodic signal used in a demodulation process.
Figure 2:
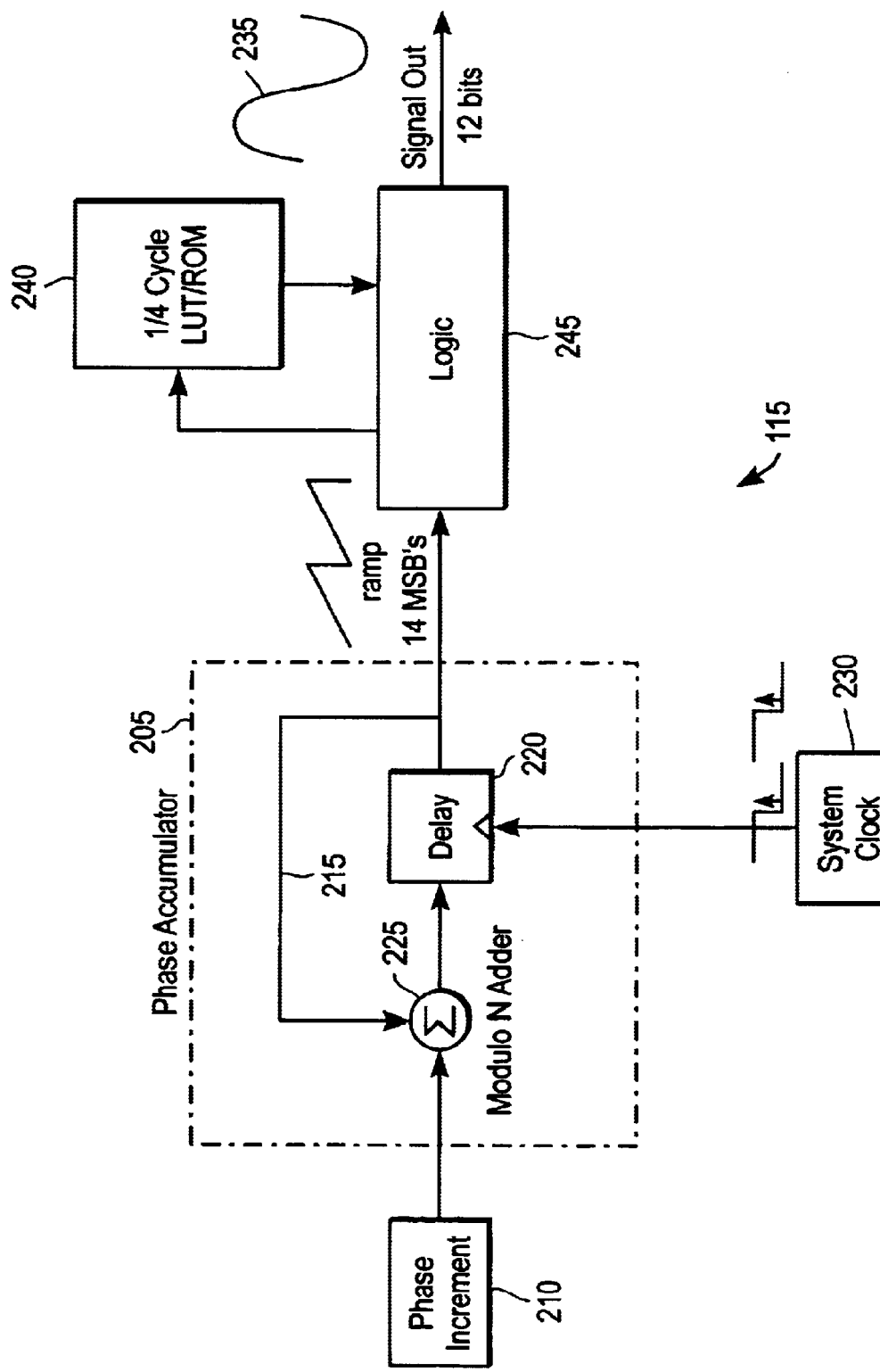
FIG. 2 is a detailed schematic of the NCO shown in FIG. 1.
Figure 3A:
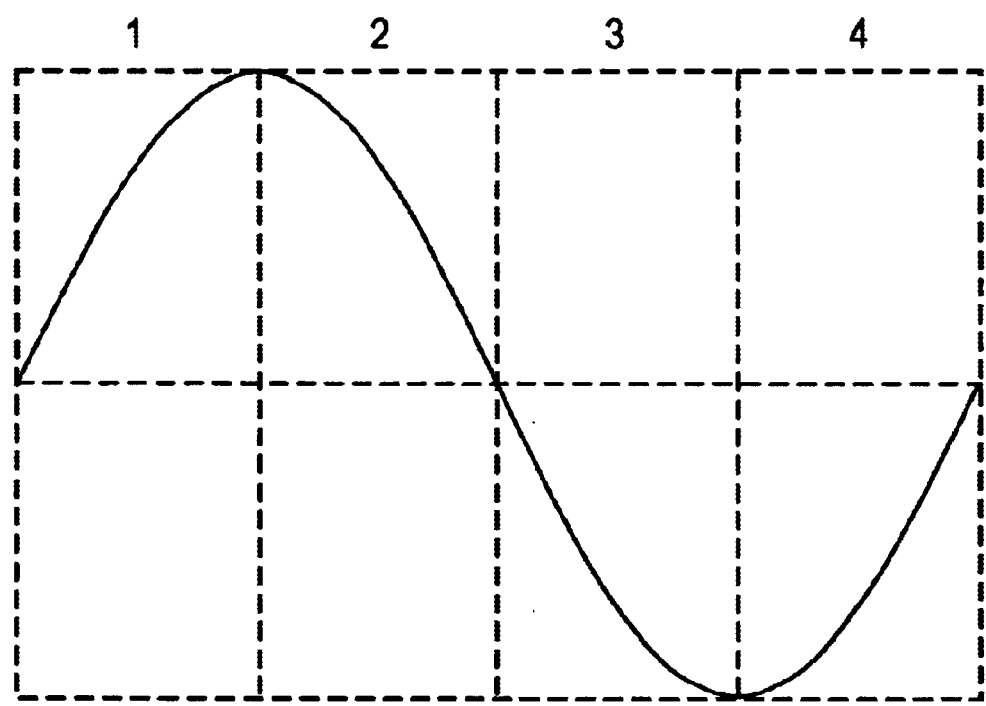
FIG. 3A shows a sine wave divided into quarter portions, such as those stored in an NCO memory.
Figure 3B:
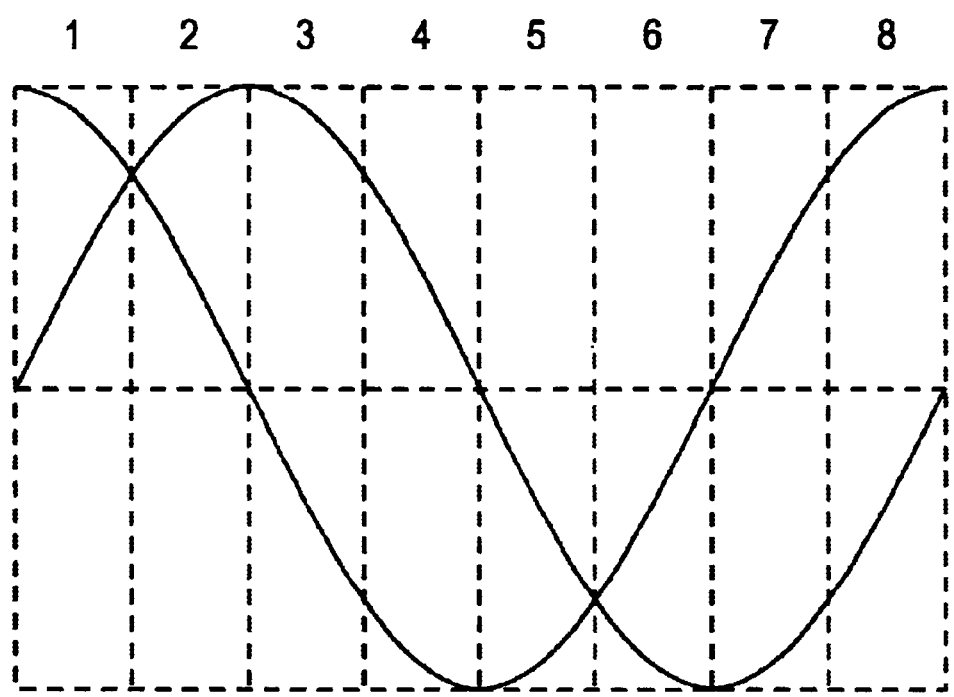
FIG. 3B shows a pair of sinusoidal signals in quadrature.
Figure 4:
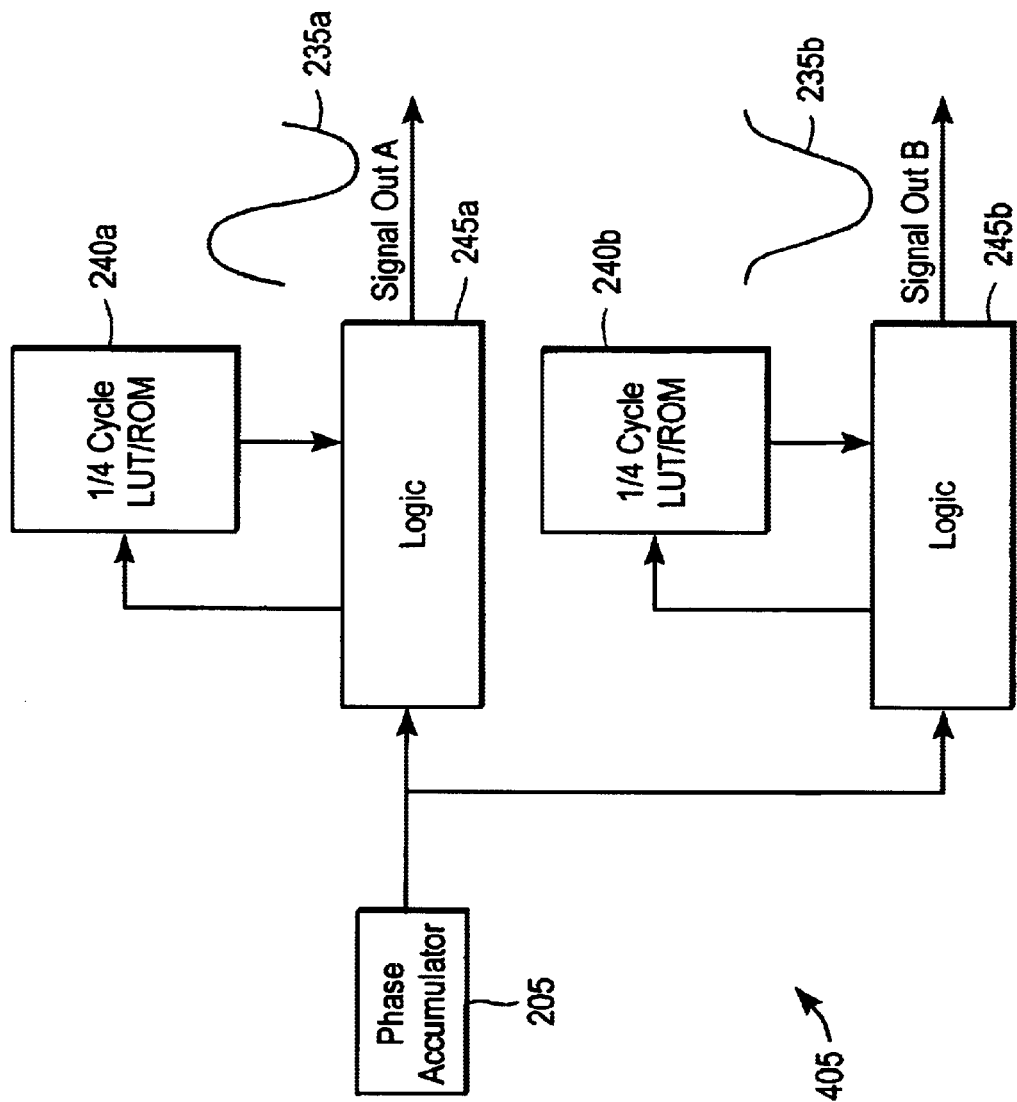
FIG. 4 is a schematic of a typical NCO providing two sinusoidally varying signals, one of the signals being a quadrature signal of the other.
Figure 5:
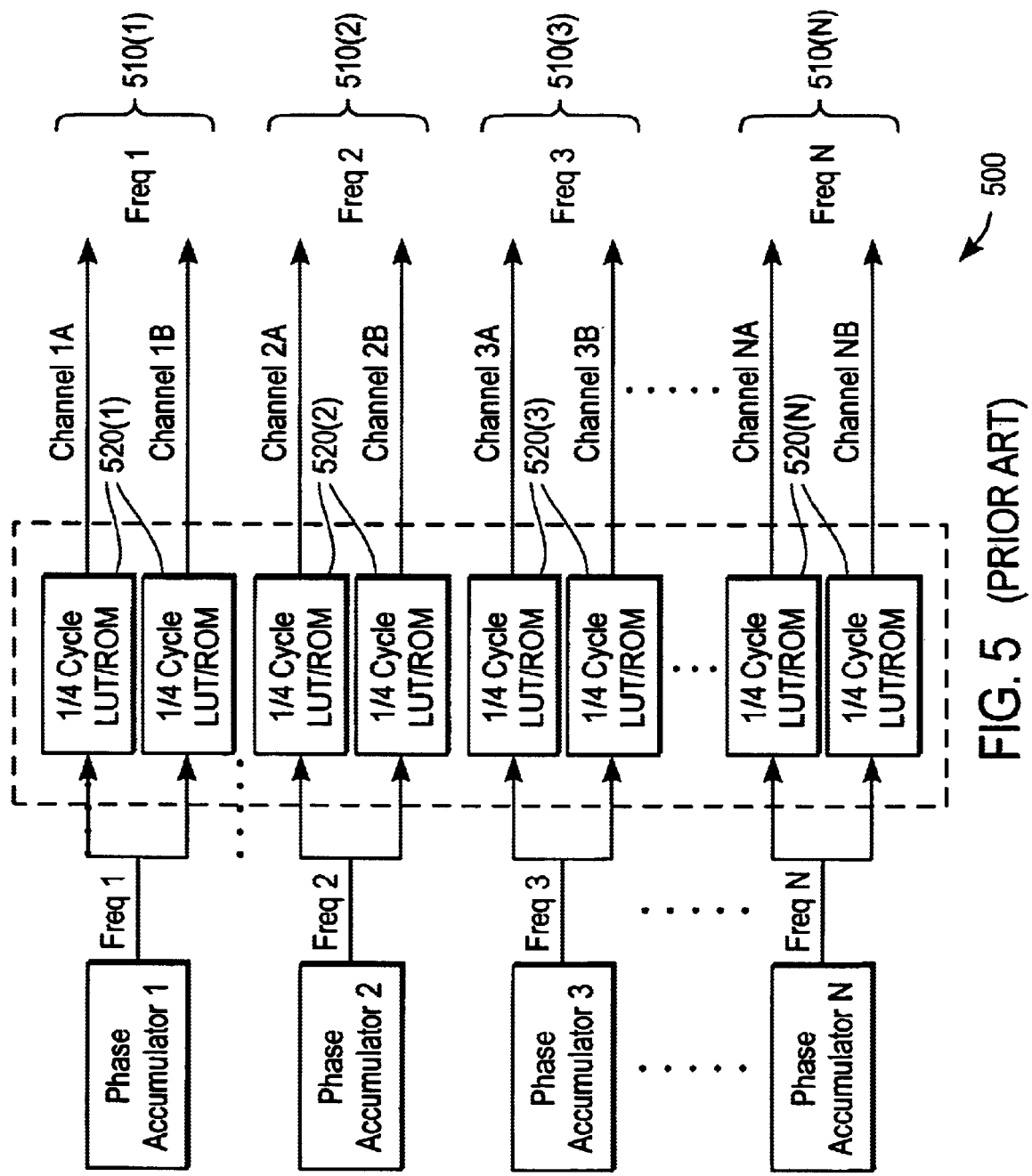
FIG. 5 is a simplified schematic of a typical NCO, which provides multiple pairs of channel outputs.
Figure 8:
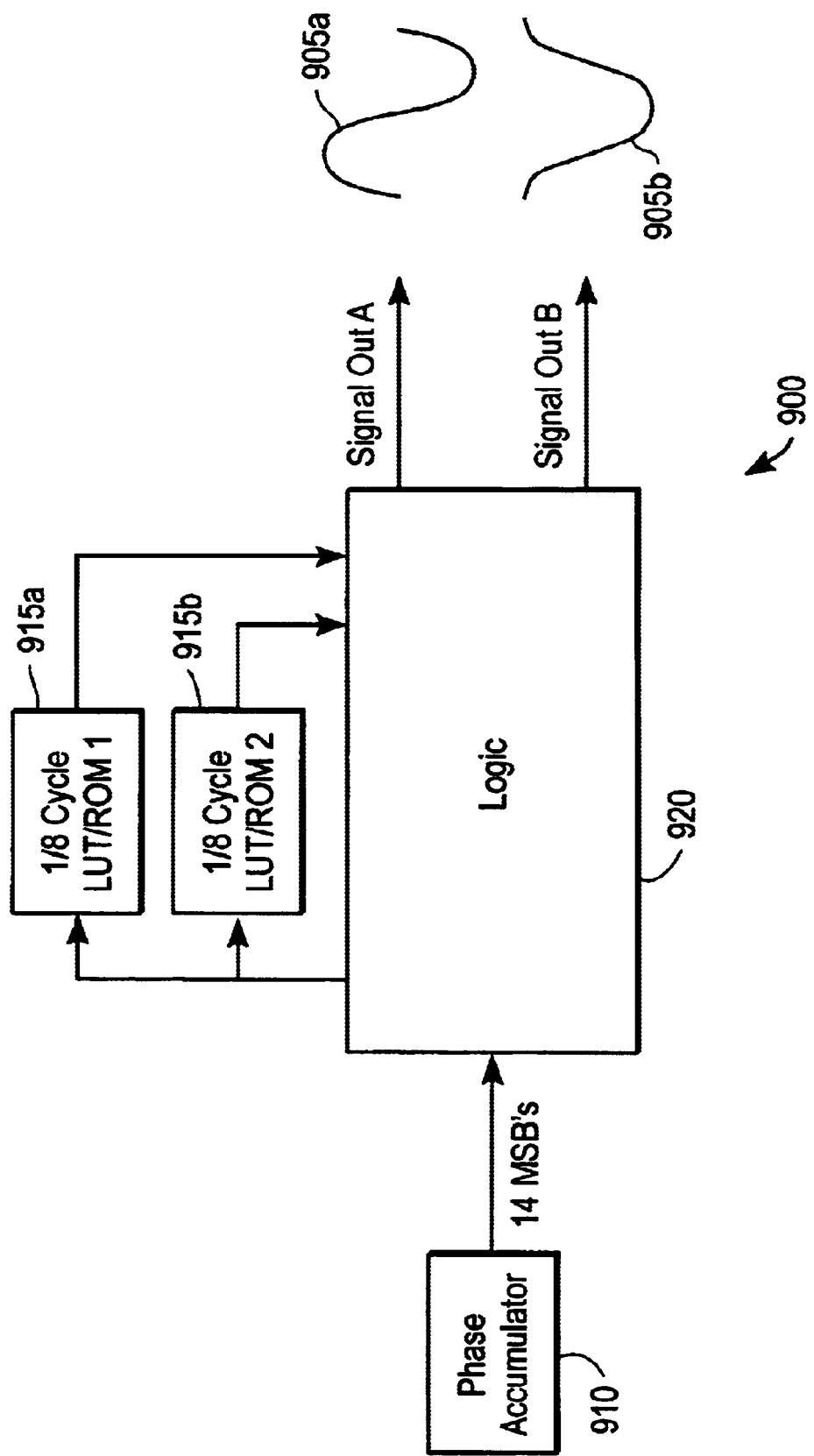
FIG. 8 is a simplified schematic of an NCO according to an embodiment of the present invention.

FIG. 8 is a simplified schematic of an NCO 900 according to an embodiment of the present invention. The general functionality of the NCO 900 is to generate and output a pair of sinusoidally-varying signals 905*a* and 905*b*, in quadrature, such as a sine wave and a cosine wave. NCO 900 includes a phase accumulator 910, discussed first below, for generating a numerical sequence, and includes first and second memories 915*a* and 915*b*, discussed second below, for storing a look-up table for complementary octants of a sine wave. The NCO 900 further includes a logic circuit 920, discussed third below, configured to accept output from phase accumulator 910, first and second memories 915*a* and 915*b*, and to logically manipulate the complementary octants stored in the memories 915*a* and 915*b* to generate sinusoidally varying signals 905*a* and 905*b*. The phase accumulator 910 can be configured along the lines as shown in FIG. 2, and outputs a periodic signal such as a ramp at the desired frequency for the sine and cosine waves.

Figure 9:
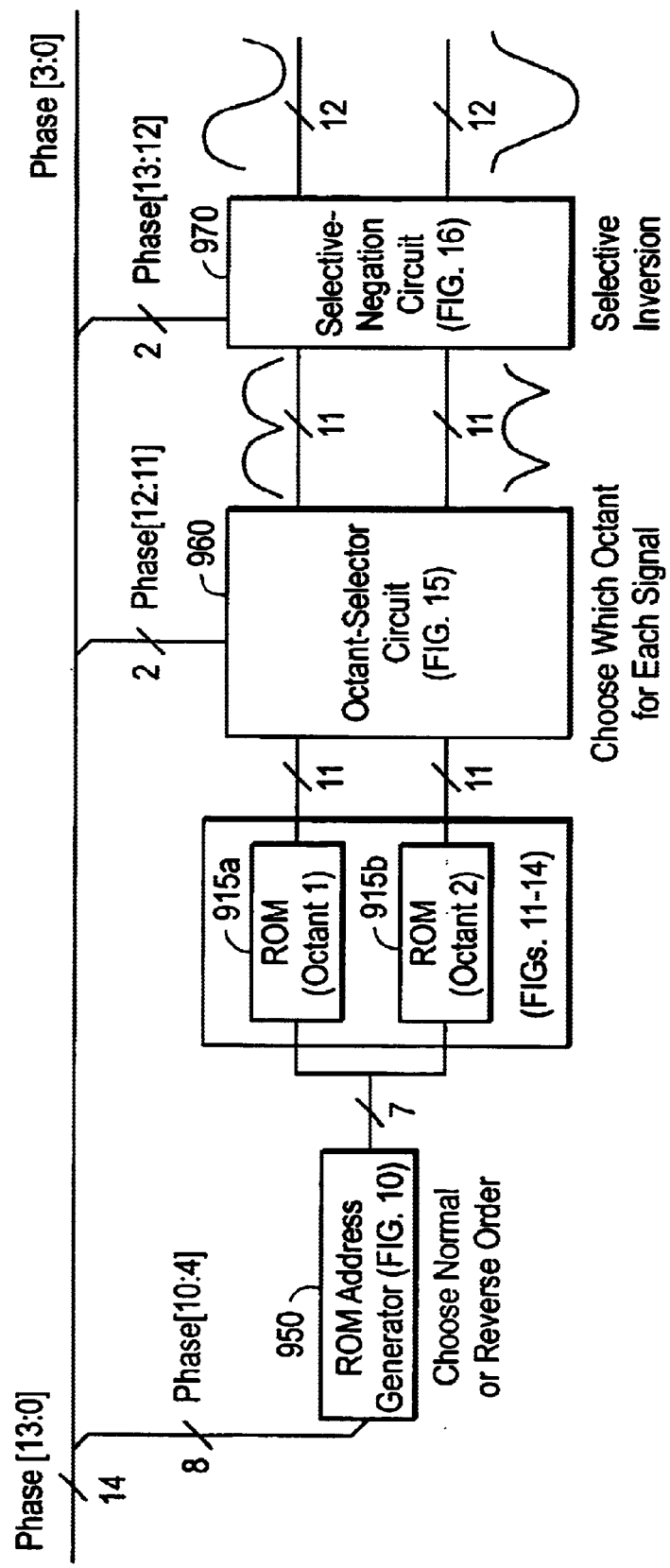
FIG. 9 is a block diagram of one implementation for the logic circuit in combination with the memories.

FIG. 9 is a block diagram of one implementation for logic 920 in combination with memories 915a and 915b. In accordance with the above-stated functionality, logic 920 includes an address generator circuit 950, an octant-selector circuit 960, and a selective-negation circuit 970. Recall that the three most significant bits from the phase accumulator (bits 13:11) specify by design which of the 8 octants of the sine wave is to be generated, while lower-order bits determine the location in time within the particular octant. In particular bit 11 toggles 8 times per full cycle, bit 12 toggles four times per full cycle, and bit 13 toggles twice per full cycle. Bits 2:0 are of use for other logic decisions and will not be discussed in the present discussion.

Address generator 950 is configured to determine whether data should be read out from memories 915a and 915b in normal or reverse order. Phase accumulator bits 10:4 are used to generate a 7-bit memory address that is applied to both the memories 915a and 915b. The result of the application of this memory address to memories 915a and 915b is a pair of data streams: one of which includes the values in the first octant, sequentially read out in the order determined by phase accumulator bit 11; and the other of which includes the values in the third octant, sequentially read out in the order determined by phase accumulator bit 11.

Octant-selector circuit 960 is configured to determine whether the sine and cosine waves at a given time should be constituted from the first and third octants, respectively, or vice versa This is determined by phase accumulator bits 12:11. The output from selection circuit 960 is a pair of data streams where the data streams from the memories 915a and 915b have been switched in accordance with the relative time in the sine wave cycle to provide unsigned sine and cosine waves.

Selective-negation circuit 970 is configured to determine which portions of the unsigned sine and cosine waves should be inverted. This is determined by phase accumulator bits 13:12. The output from selective-negation circuit 970 is a pair of data streams where the data streams from octant-selector circuit 960 have been selectively inverted in accordance with the portions of the cycle in which the sine wave and cosine waves are negative to provide signed sine and cosine waves.

Figure 10:
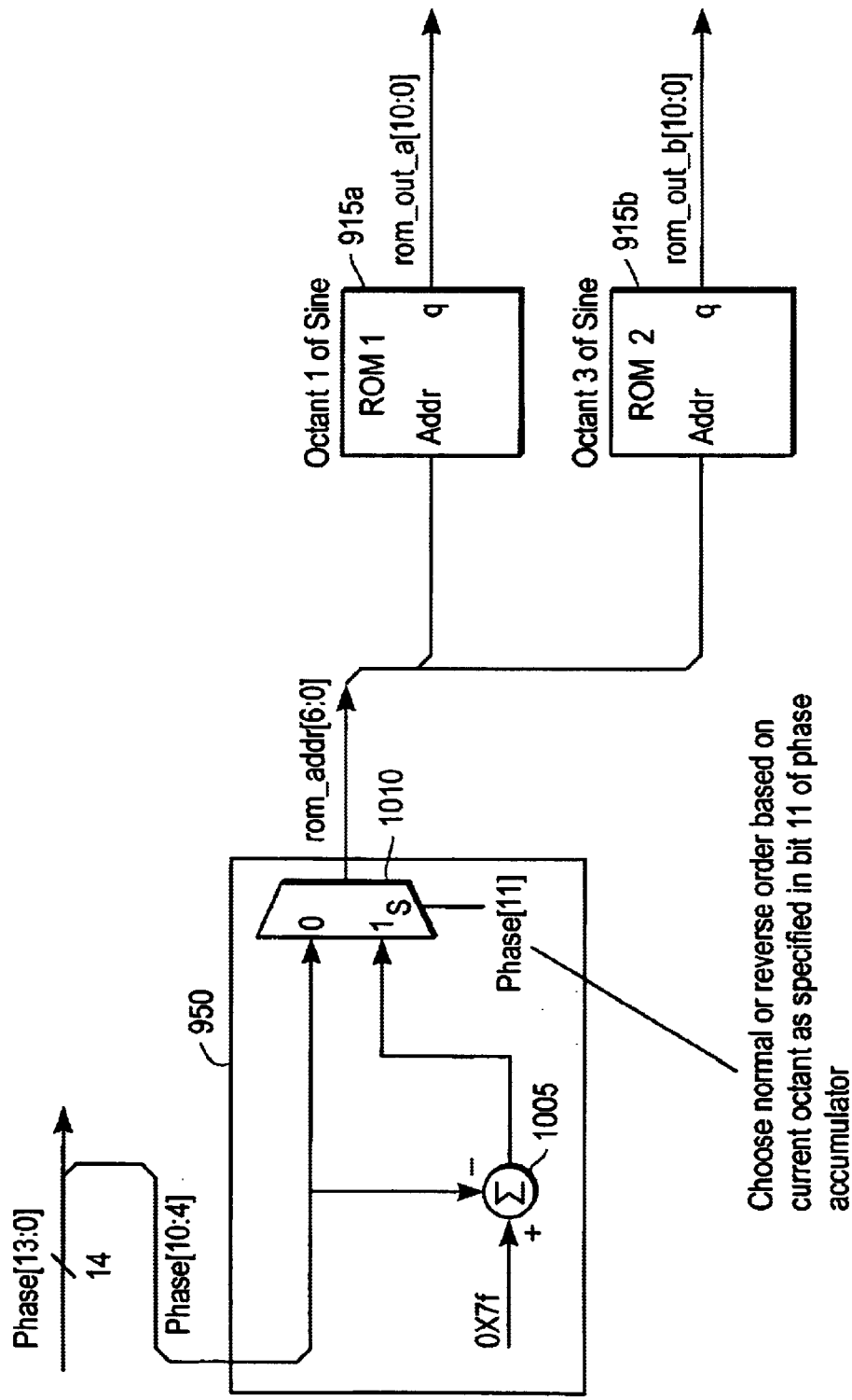
FIG. 10 is a simplified schematic of an address generator circuit and shows portions of the logic circuit.

FIG. 10 is a simplified schematic of address generator circuit 950 and shows portions of logic circuit 920, which is coupled between phase accumulator 910 (not shown) and memories 915a and 915b. According to one embodiment of the present invention, phase accumulator 910 (FIG. 9) is a 14-bit accumulator with the bits being numbered from 0 to 13. The phase accumulator 910 is configured to generate a first set of 7-bit memory addresses, a set of 3 control bits, and 4 bits that may be used for various other function, which will not be described in the present discussion. According to one embodiment, the phase accumulator generates the first set of 7-bit memory addresses in ascending order and automatically resets from the highest memory address to the lowest address upon reaching the highest address. For example, in counting from 0000000, the lowest binary address, to 1111111, the highest binary address, the phase accumulator 910 upon reaching 1111111 automatically resets and begins counting up from 0000000. According to one embodiment, the 7 memory address bits are bits 10:4 of bits 13:0 generated by the phase accumulator 910. The three control bits are bits 13:11 of bits 13:0 generated by the phase accumulator 910. For convenience, bit 11 is referred to as the first control bit, bit 12 is referred to as the second control bit, and bit 13 is referred to as the third control bit. It should be understood that the positions of the bits and number of bits used for the memory addresses may be varied without varying the scope of the present invention. The same is true for the control bits.

According to one embodiment, a second set of memory addresses is generated from the first set of memory addresses by a summation circuit 1005. Summation circuit 1005 generates the second set of memory addresses by subtracting each memory address in the first set from a fixed number. If the fixed number is, for example, the highest memory address (e.g., 127 decimal or 7f hexadecimal), the first and second set of memory addresses will be anti-symmetric. That is, the first set of memory addresses will cycle from the lowest address to the highest address (e.g., 0–127 decimal) in the same time period that the second set of memory addresses cycle from the highest address to the lowest address (e.g., 127–0 decimal).

As shown in FIG. 10, address generator 950 includes a multiplexer 1010 configured to selectively direct the two sets of memory addresses to memories 915a and 915b for the purpose of accessing the contents of the look-up tables stored therein. The purpose of selectively directing the sets of memory addresses to the memories 915a and 915b was outlined above and will be described in greater detail below. Whether the multiplexer directs the ascending or descending memory addresses to the memories 915a and 915b is controlled by the first control bit. For example, if the first control bit is 0, the multiplexer 1010 directs the first set of memory addresses to the memories 915a and 915b, and if the first control bit is 1, the multiplexer 1010 direct the second set of memory addresses to the memories 915a and 915b.

Figure 11:
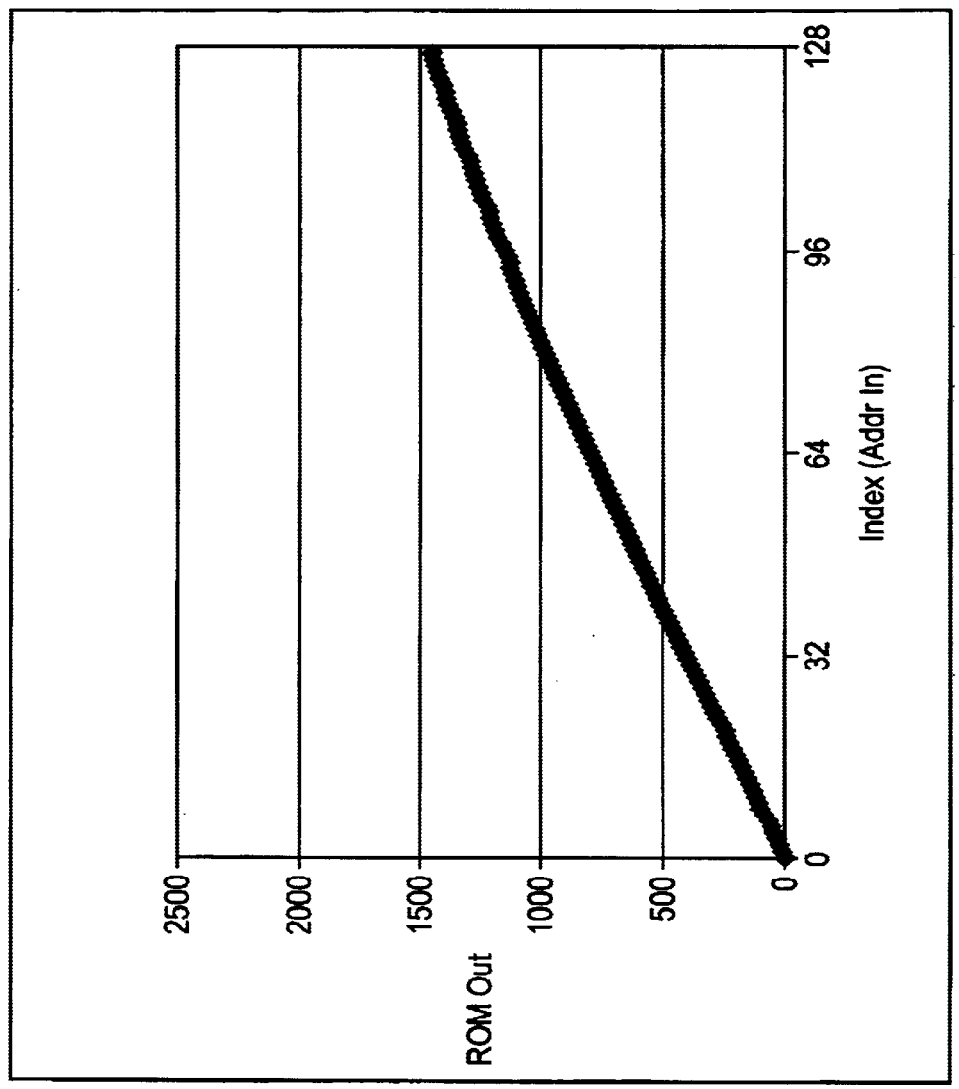
FIG. 11 shows octant 1 as read from memory in ascending-memory address order (e.g., 0–127 decimal)
Figure 12:
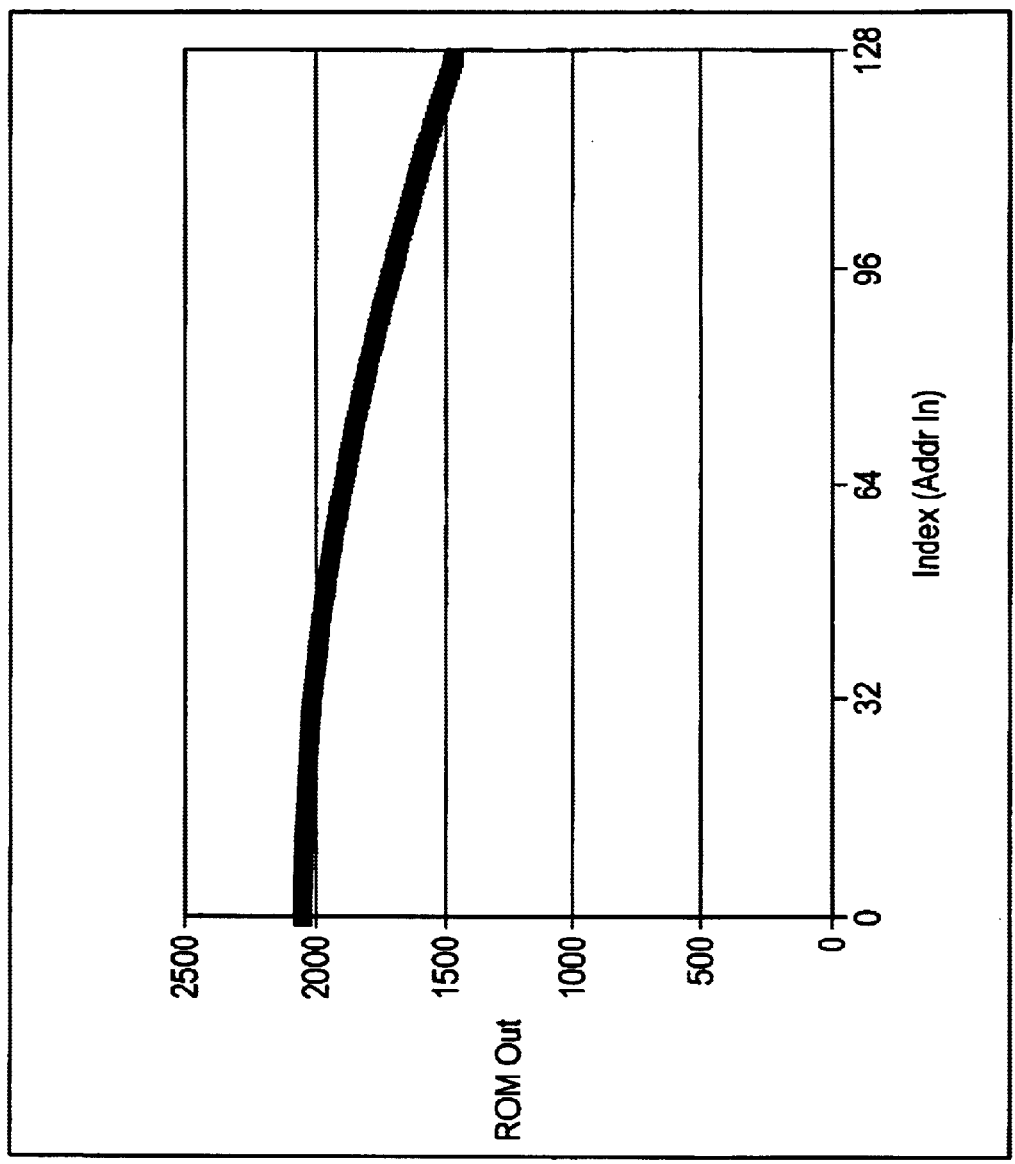
FIG. 12 shows octant 3 as read from memory in ascending-memory address order.
Figure 13:
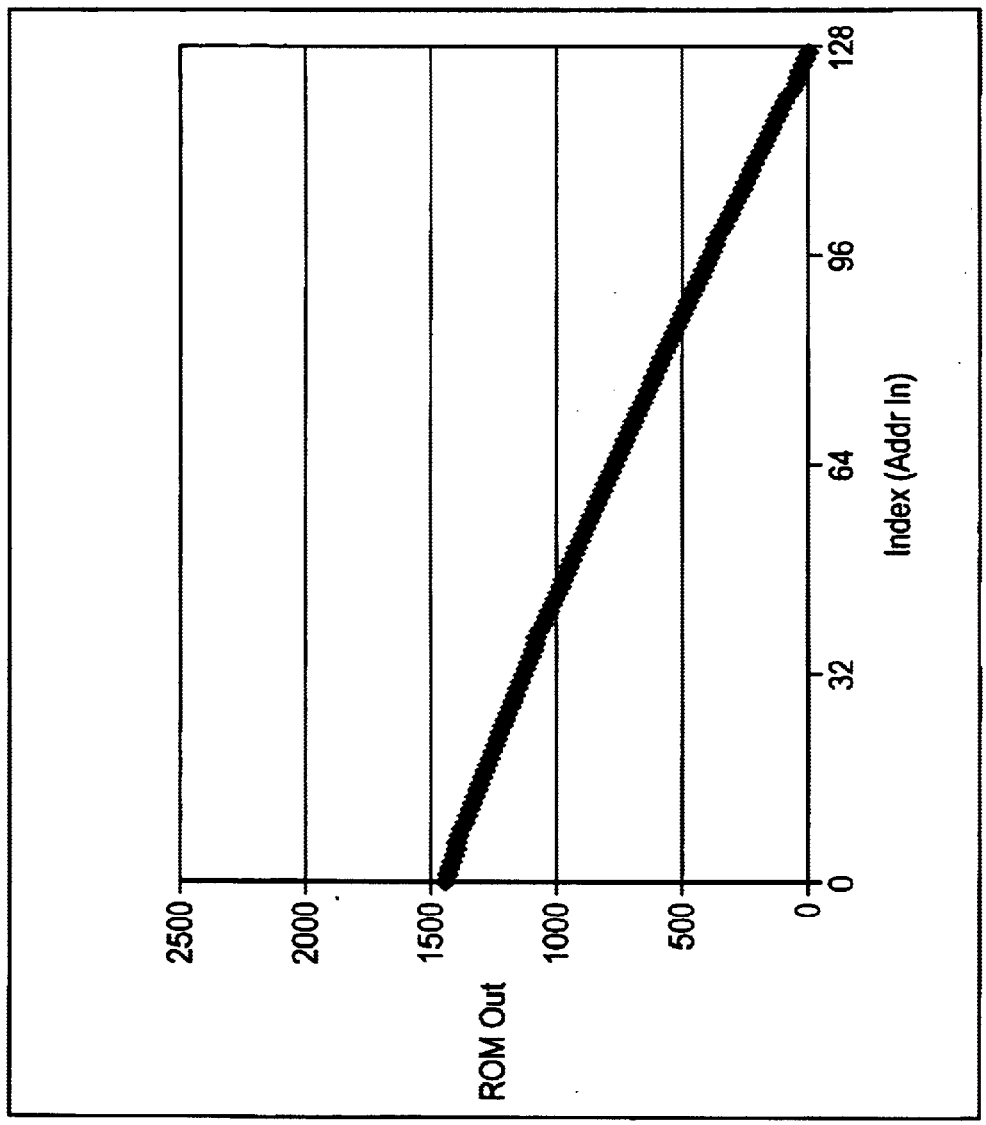
FIG. 13 shows octant 1 as read from memory in descending memory address order (e.g., 127–0 decimal)
Figure 14:
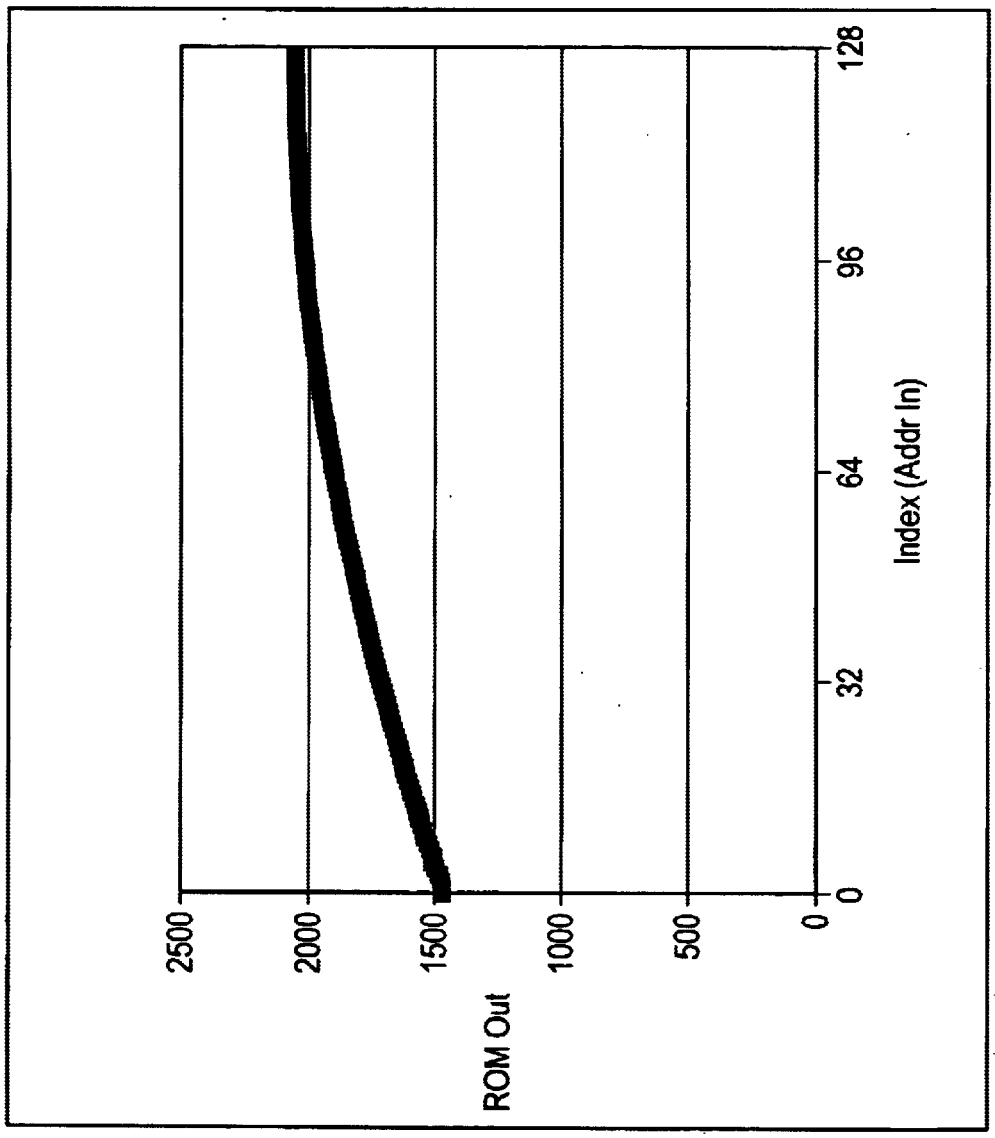
FIG. 14 shows octant 3 as read from memory in descending memory address order.

Memories 915a and 915b store respective octants of a complementary set of octants. According to a one embodiment of the present invention, memory 915a stores octant 1 and memory 915b stores octant 3, as shown in the graphical representation in FIGS. 11 and 12, respectively. In the graphical representations, the horizontal axes are the memories' addresses and the vertical axes are indices of the height of the stored octant. FIGS. 11 and 12 show octants 1 and 3, respectively, as read from the memories 915a and 915b in ascending memory address order (e.g., 0–127 decimal). FIGS. 13 and 14 show octants 1 and 3, horizontally inverted, as read from the memories in descending-memory address order (e.g., 127–0 decimal). Reading the memories in ascending-memory address order is referred to herein as "normal order," and reading the memories 915a and 915b in descending-memory address order is referred to herein as "reverse order." As should be apparent, reading the memories 915a and 915b in reverse order provides the horizontal inversion function, discussed above, and is controlled by the first control bit generated by the phase accumulator.

According to one embodiment of the present invention memories 915a and 915b are read-only memories (ROMs). The memories may be a variety of ROM types, such as EPROMS, EEPROMS, flash ROMs and the like. While ROMs 915a and 915b are shown as discrete memories, the memories may be combined into a single memory sharing decoder logic. According to a specific embodiment ROMs 915a and 915b have at least a seven-bit addressing scheme and store at least 11 bits per memory address. According to an alternative embodiment the memories are dynamic random access memories (DRAMs) having similar addressing and memory storage capabilities.

Figure 15:
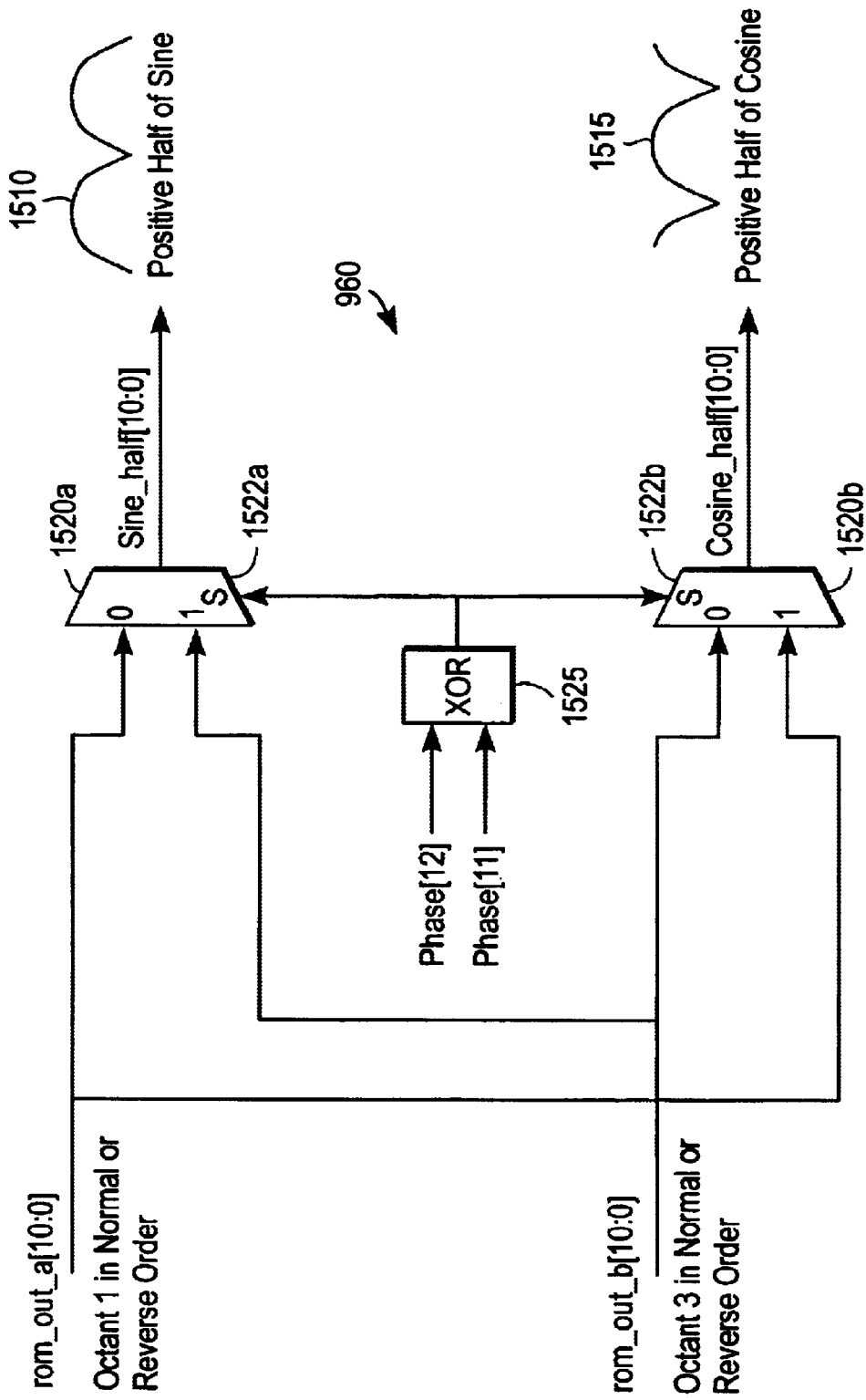
FIG. 15 is a simplified schematic of octant-selector circuit of the logic circuit.

FIG. 15 is a simplified schematic of octant-selector circuit 960 of logic circuit 920. Octant-selector circuit 960 is configured to receive output from the memories. The octant-selector circuit 960 selectively transmits either an octant, or the horizontal inverse of an octant, in order to form a positive-half-sine wave 1510, also referred to as an unsigned-sine wave, and a positive-half-cosine wave 1515, also referred to as an unsigned-cosine wave. Octant-selector circuit 960 includes first and second multiplexers 1520*a* and 1520*b*, respectively. The select controls 1522*a* and 1522*b* of multiplexers 1520*a* and 1520*b*, respectively, are coupled to the output of an XOR logic gate 1525, which receives as input the first and second control bits. According to one embodiment, when the XOR logic is 0, multiplexer 1520*a* transmits the output of memory 915*a* (i.e., octant 1 in normal or reverse order), and multiplexer 1520*b* transmits the output of memory 915*b* (i.e., octant 3 in normal or reverse order). Further, when the XOR logic is 1, multiplexer 1520*a* transmits the output of memory 915*b* and multiplexer 1520*b* transmits the output of memory 915*a*.

Figure 16:
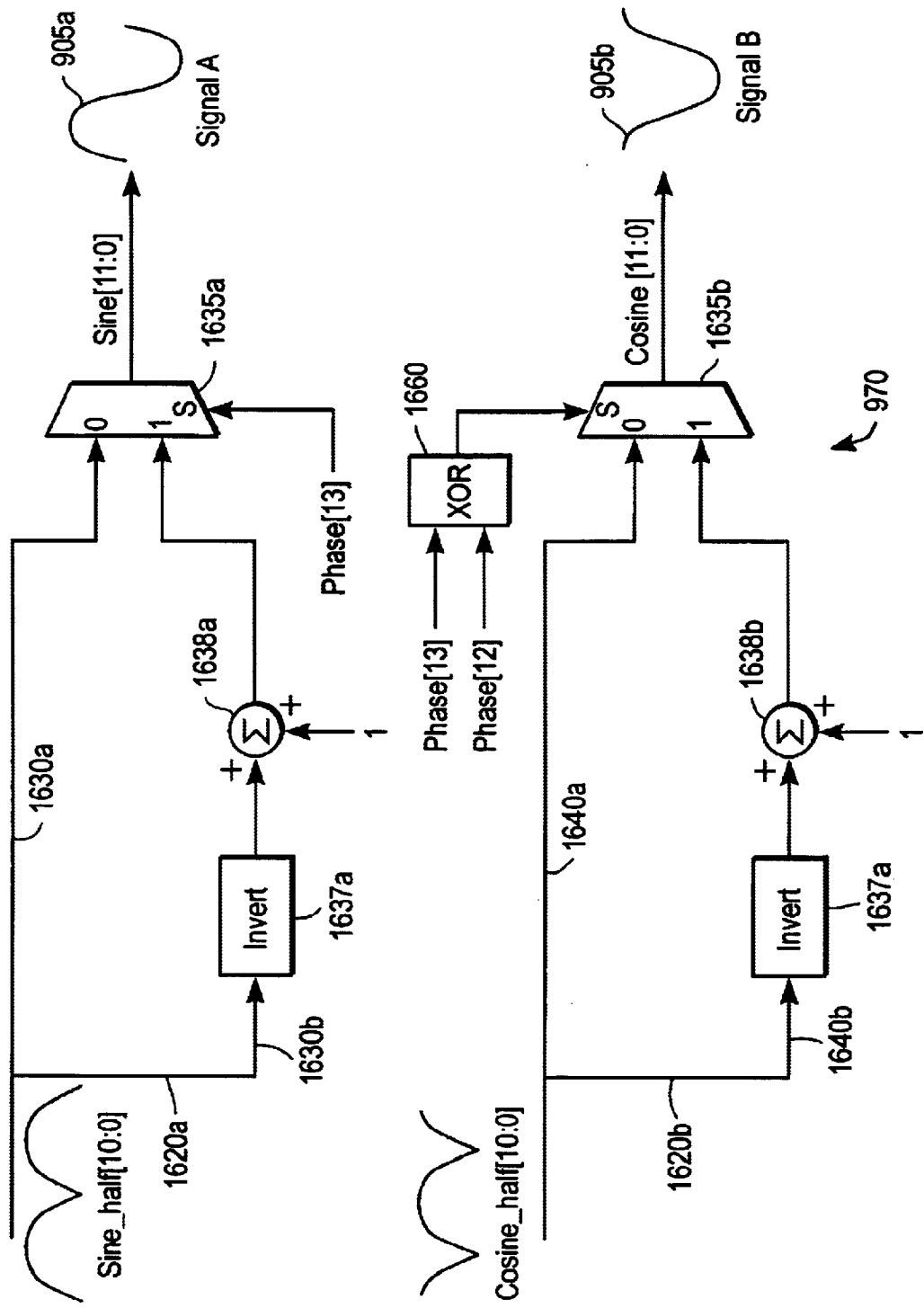
FIG. 16 is a simplified schematic of selective-negation circuit 970.

FIG. 16 is a simplified schematic of selective-negation circuit 970, which is configured to negate (i.e., vertically invert) the unsigned-sine wave (i.e., generate a "negated-sine wave") and unsigned-cosine wave (i.e., generate a "negated-cosine wave") by generating the two's complement of the unsigned-sine wave and unsigned-cosine wave, respectively. By selectively multiplexing the negated-sine wave and the unsigned-sine wave, sine wave 905*a* is generated. Similarly, by selectively multiplexing the negated-cosine wave and the unsigned-cosine wave, cosine wave 905*b* is generated. These processes and associated circuits will be described in further detail.

Selective-negation circuit 970 includes first and second channels 1620*a* and 1620*b*. The first channel 1620*a* outputs sine wave 905*a*, and the second channel outputs cosine wave 905*b*. The first channel includes first and second paths 1630*a* and 1630*b*, respectively, each being coupled to a multiplexer 1635*a*. The first path 1620*a* is a through path along which the unsigned-sine wave is transmitted to multiplexer 1635*a* The second path 1630*b* is an inversion path, which includes inversion circuitry to negate (i.e., vertically invert) the unsigned-sine wave. Negation is performed by calculating the two's complement of the unsigned-sine wave. Circuitry used to calculate the two's complement include an inverter 1637*a* that generates the complement of the unsigned-sine wave and an adder 1638*b*, which adds a one to the complement. Those of skill in the art will know of other inversion circuits that may be used to generate the negated-sine wave. The second channel 1620*b* is similarly configured having a through path 1640*a* and an inversion path 1640*b*, which are coupled to a multiplexer 1635*b*. Along the inversion path the unsigned-cosine wave is negated (i.e., vertically inverted). Similar to path 1630*b*, path 1640*b* includes an inverter 1637*b* for generating the complement of the unsigned-cosine wave and an adder 1638*b*, which adds a one to the complement, thus negating the unsigned-cosine wave (i.e., generating a negated-cosine wave).

The through path of multiplexer 1635*a* is selectively controlled by the third control bit generated by the phase accumulator. For example, if the third control bit is 0, the unsigned-sine wave transmitted along path 1630*a* is transmitted through multiplexer 1635*a*. Alternatively, if the third control bit is 1, negated-sine wave traversing path 1630*b* is transmitted through multiplexer 1635*a*. More specifically, if the third control bit is 0, the first, second, third, and fourth octants are transmitted by multiplexer 1635*a*. If the third control bit is a 1, the fifth, sixth, seventh, and eighth octants are transmitted by the multiplexer 1635*a*. Thus, as the first, second, third, and fourth octants are transmitted without inversion, one half cycle of sine wave 905*a* is transmitted by the multiplexer 1635*a*, and as the fifth, sixth, seventh, and eighths octants are transmitted before or thereafter, the other half of the sine wave 905*a* is transmitted. Thus a full cycle of a sine wave 905*a* is generated.

The through path of multiplexer 1635*b* is selectively controlled by an XOR gate 1660, which is configured to perform XOR logic on the second and third control bits generated by the phase accumulator 910. For example, if the output of XOR gate 1660 is 0, the unsigned-cosine wave transmitted along path 1640*a* is transmitted through multiplexer 1635*b*. If the output the XOR gate is 1, the negated-cosine wave traversing path 1640*b* is transmitted through multiplexer 1635*b*. By selectively transmitting portions of the negated-cosine wave and unsigned-sine wave, a full cycle of a cosine wave 905*b* is generated.

The foregoing is summarized in Table 2 below:

TABLE 2

| Phase Accum MSBs [13,12,11] | Signal A → sine | Signal B → cosine |
|---|---|---|
| 000 | ROM 915a, normal order, positive | ROM 915b, normal order, positive |
| 001 | ROM 915b, reverse order, positive | ROM 915a, reverse order, positive |
| 010 | ROM 915b, normal order, positive | ROM 915a, normal order, negated |
| 011 | ROM 915a, rom1, reverse order, positive | ROM 915b, reverse order, negated |
| 100 | ROM 915a, normal order, negated | ROM 915b, normal order, negated |
| 101 | ROM 915b, reverse order, negated | ROM 915a, reverse order, negated |
| 110 | ROM 915b, normal order, negated | ROM 915a, normal order, positive |
| 111 | ROM 915a, reverse order, negated | ROM 915b, reverse order, positive |

Apparent from the preceding discussion, embodiments of the present invention generate two sinusoidally varying signals, the second in quadrature with respect to the first. It is noted these signals are generated using relatively small memories (i.e., storing sine wave octants) and without the use of time multiplexing circuitry. Accordingly, two seemingly conflicting goals are achieved. From another perspective, generation of two signals at one half the of the required in a time-multiplex scheme is realized. This gain in time can be put to use at a higher level in the system architecture.

Multi-channel Numerically Controlled Oscillator

Figure 17:
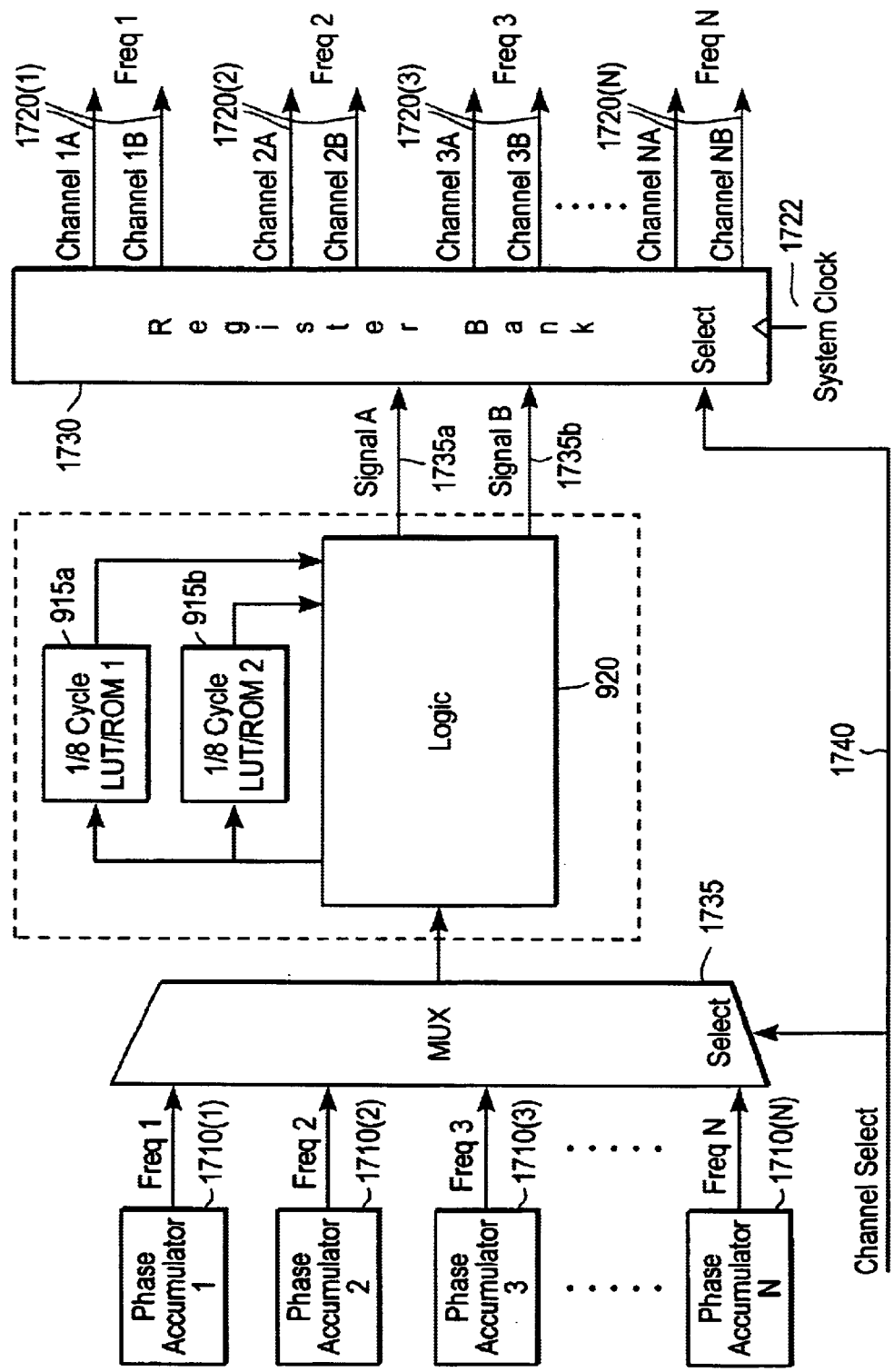
FIG. 17 is a simplified schematic of a multi-channel NCO with time-shared memories according to an embodiment of the present invention.

FIG. 17 is a simplified schematic of another NCO 1705 according to an embodiment of the present invention. It is noted that a similar numeral scheme will be used for elements similar to those described above. NCO 1705 shown in FIG. 17 differs from the NCO embodiment shown in FIG. 10 in that NCO 1705 includes a set of N phase accumulators 1710 (each phase accumulator is labeled with a numerical suffix), each generating a set of memory addresses and control bits at a different frequency, time share memories 915*a* and 915*b*, and time share logic circuit 920. Further, NCO 1705 is a multi-channel NCO, in other words, it has N pairs of output channels 1720 (each pair is labeled with a numerical suffix) for transmitting pairs of sinusoids in quadrature, which have frequencies corresponding to their associated phase accumulators. Multi-channel NCO 1705, which provides multiple pairs of output channels 1720, includes a multiplexer 1725 coupled between phase accumulators 1710 and logic circuit 920, and includes a register bank 1730 for routing output signals 1735*a* and 1735*b* from the logic circuit 920 to a given pair of output channels 1720. A channel-select signal 1740 serves as a time-multiplexer-control signal. Signal 1740 selects a given phase accumulator output for transmission through the multiplexer 1735 and selects a given pair of output channels 1720 to receive output signals 1735*a* and 1735*b* transmitted through register bank 1730. Thus the channel-select signal 1740 serves to match each phase accumulator 1710 to a given pair of output channels 1720. For example, if the channel-select signal signals multiplexer 1735 to transmit input from phase accumulator 1710(3) to the memories 915*a* and 915*b* and logic circuit 920, the register bank 1730 is also signaled by the channel-select signal to transmit signals 1735*a* and 1735*b*to output channels 1720(3). A system clock 1722 serves to clock signals 1735*a* and 1735*b*through the register bank and to chronologically synchronize output of the phase accumulators 1710. According to one embodiment, the register bank 1730 is a bank of flip-flop that latch signals 1735*a* and 1735*b* in response to the system clock toggling.

Similar to NCO embodiments described above, memories 915*a* and 915*b* are configured to implement a look-up tables that store complementary octants of a sine wave, (e.g., octants 1 and 3), and logic circuit 920 is configured to manipulate the output of the memories 915*a* and 915*b* under control of a set of control bits to generate a pair of sinusoidally varying signals, i.e., signals 1735*a* and 1735*b*.

While the above is a complete description of specific embodiments of the invention, various modifications, alternative constructions, and equivalents may be used. For example, while the summation circuit shown in FIG. 10 has been described as being part of the logic circuit, the summation circuit may be a circuit in the phase accumulator. Further, while the logic circuit described above has been described as being used for ROMs that are configured to store complementary octants 1 and 3, the logic circuit and may easily modified to manipulate other complementary octants, such as octants 2 and 4, for example. Further, while the complementary octants have been described as being stored in two memories, the complementary octants may be stored in a single memory with parallel addressing. That is the memory has two independent addresses that may be used in parallel to access unique memory locations. Those of skill in the art would be able to easily change the logic circuit to manipulate various complementary octants after having read the above discussion. Further, as stated above, the reference to sinusoidal waveforms is for convenience and is intended to cover other waveforms having the symmetry property that an entire cycle of the waveform can be reconstructed using a pair of complementary octants.

These equivalents are considered to be within the scope of the present invention. Therefore, the above description should not be taken as limiting the scope of the invention as defined by the claims.

What is claimed is:

1. A numerically controlled oscillator (NCO) comprising:
   a phase accumulator configured to generate a periodic multi-bit signal at a given frequency, wherein:
      the periodic multi-bit signal includes a set of control bits and a set of address bits,
      the control bits include a set of three control bits, and binary combinations of the three control bits map to octants of a sinusoidal waveform;
   a first memory configured to store an octant of the sinusoidal waveform;
   a second memory configured to store a complementary octant of the sinusoidal waveform; and
   a control circuit, responsive to at least a portion of the set of control bits and coupled to the first and second memories, the control circuit configured to access the first and second memories in parallel and construct respective sine and cosine waves at the given frequency.

2. The NCO of claim 1 wherein the control circuit includes:
   a memory address generator, responsive to a first subset of bits from the set of control bits, configured to generate addresses for said first and second memories, said addresses providing for access in a normal sequence of increasing numerical values or access in a reverse sequence of decreasing numerical values;
   an octant-selector circuit, responsive to a second subset of bits from the set of control bits, the octant-selector circuit being connected to receive outputs from the first and second memories and configured to use one of the first and second memory outputs to construct an unsigned-sine wave and to use the other of the first and second memory outputs to construct an unsigned-cosine wave; and
   a selective-negation circuit, responsive to a third subset of bits from the set of control bits, the selective negation circuit being connected to receive the unsigned-sine wave and the unsigned-cosine wave from the octant-selector circuit and configured to generate the sine wave and the cosine wave therefrom.

3. The NCO of claim 1 wherein the control circuit includes:
   an octant-selector circuit coupled to the first and second memories, the octant-selector circuit configured to receive output from the first and second memories, and to generate from the output an unsigned-sine wave and an unsigned-cosine wave; and
   a selective-negation circuit coupled to the octant-selector circuit, the selective-negation circuit configured generate the sine wave from the unsigned-sine wave and to generate the cosine wave from the unsigned-cosine wave.

4. The NCO of claim 1 wherein:
   the octant stored in the first memory is a linear octant; and
   the other octant store in the second memory is a crescent octant.

5. The NCO of claim 1 wherein:
   the octant stored in the first memory is a first octant of the sine wave; and
   the other octant stored in the second memory is a third octant of the sine wave.

6. The NCO of claim 1 wherein the phase accumulator is configured to output the address bits in a first order to a first accumulator output and in a second order to a second accumulator output.

7. The NCO of claim 1 further including a selector circuit coupled between the phase accumulator and the first memory and coupled between the phase accumulator and the second memory, the selector circuit being configured to receive the address bits from the phase accumulator, and the selector circuit in response to a first control bit of the set of control bits selectively provides the address bits to the first and second memories in a first order or in a second order.

8. The NCO of claim 7 wherein:
   the first and second memories in response to receiving the address bits in the first order output their respective octants in one of the normal order and the reverse order, and in response to receiving the address bits in the second order output their respective octants in the other of the normal order and the reverse order.

9. The NCO of claim 8 wherein:

the normal order is ascending order; and the reverse order is descending order.

10. The NCO of claim 2 wherein:

the octant-selector circuit includes first and second selector circuits;

one of the first and second selector circuits in response to first and second control bits of the set of control bits transmit output from the first memory; and the other of the first and second selector circuits in response to first and second control bits of the set of control bits transmit output from the second memory.

11. The NCO of claim 10 further including a logic gate coupled to a selector input of the first selector circuit and to a selector input of the second selector circuit, the logic gate configured generate a result from a logical operation on the first and second control bits.

12. The NCO of claim 11 wherein:

the logic gate is an XOR gate; and the logical operation is XOR logic.

13. The NCO of claim 2 wherein:

the selective-negation circuit calculates the two's complement of the unsigned-sine wave to generate a negated-sine wave and selectively multiplexes the unsigned-sine wave and the negated-sine wave to generate the sine wave; and the selective-negation circuit calculates the two complement of the unsigned-cosine wave to generate a negated-cosine wave and selectively multiplexes the unsigned-cosine wave and the negated-cosine wave to generate the cosine wave.

14. The NCO of claim 13 wherein:

multiplexing of the unsigned-cosine wave and the negated-cosine wave is controlled by an XOR logical operation on second and third control bits of the set of three control bits; and multiplexing of the unsigned-sine wave and the negated-sine wave is controlled by the third control bit.

15. A method of operating a numerically controlled oscillator, the method comprising:

generating a set of memory addresses and at least first, second, and third control bits in a phase accumulator;

transmitting the memory addresses to first and second memories;

storing in the first memory an octant of a sine wave;

storing in the second memory another octant of a sine wave that is complementary to the octant stored in the first memory;

transmitting from the first memory the octant in normal order or reverse order;

transmitting from the second memory the other octant in normal order or reverse order;

receiving the octant and other octant in a octant-selector circuit;

outputting from the octant-selector circuit an unsigned-sine wave and an unsigned-cosine wave; and generating from the unsigned-sine wave and unsigned-cosine wave a sine wave and a cosine wave, respectively in a selective-negation circuit.

16. The method of claim 15 wherein:

the memory addresses are generated in ascending order and descending order;

the first memory outputs the octant in normal order or reverse order in response to receiving the memory addresses in ascending order or descending order; and the second memory outputs the octant in normal order or reverse order in response to receiving the memory addresses in ascending order or descending order.

17. The method of claim 16 wherein the step of transmitting the memory addresses to first and second memories includes selectively transmitting the memory addresses in ascending order or descending order in response to the first control bit.

18. The method of claim 15 wherein the octant-selector circuit outputs the unsigned-sine wave to one of first and second octant-selector circuit outputs and outputs the unsigned-cosine wave to the other of the first and second octant-selector circuit outputs in response to an XOR logic operation on the first and second control bits.

19. The method of claim 15 wherein:

the selective-negation circuit calculates the two's complement of the unsigned-sine wave to generate a negated-sine wave and selectively multiplexes the unsigned-sine wave and the negated-sine wave to generate the sine wave; and the selective-negation circuit calculates the two's complement of the unsigned-cosine wave to generate a negated-cosine wave and selectively multiplexes the unsigned-cosine wave and the negated-cosine wave to generate the cosine wave.

20. A multi-channel numerical control oscillator comprising:

a plurality of phase accumulators configured to generate a plurality of memory addresses and a plurality of control bits;

a multiplexer coupled to the plurality of phase accumulators, the multiplexer configured to receive output from the phase accumulators, and to selectively transmit the output of one of the phase accumulators;

a channel select coupled to the multiplexer, the channel select configured to deliver a channel select signal to the multiplexer for controlling the multiplexer selective transmission;

first and second memories coupled to the multiplexer, the first and second memories configured to receive memory addresses transmitted by the multiplexer, the first memory configured to store an octant of the sine wave, the second memory configured to store another octant of the sine wave, wherein the octants are complementary;

a control circuit coupled to the first and second memories, the control circuit being configured to receive the octant from the first memory, to receive the other octant from the second memory, to construct a sine wave and a cosine wave, and selectively output to a first output one of the sine wave and the cosine wave and output to a second output the other of the sine wave and cosine wave; and a register back coupled to the control circuit, the register bank configured to receive the sine and cosine waves and selectively fan out the signal to a plurality of output channels, wherein the channel select is configured to deliver the channel select signal to the register bank for controlling selective fan out.

21. A method of operating a numerically controlled oscillator, the method comprising:
storing an octant of a sine wave;
storing another octant of a sine wave that is complementary to the octant;
generating a first set of memory addresses in ascending order, a second set of memory addresses in descending order, and a set of at least three control bits;
transmitting the first or second memory addresses in response to one of the control bits;
generating the octant and the other octant in normal or reverse order in response to receiving the first set of memory addresses or the second set of memory addresses;
generating an unsigned-sine wave and an unsigned-cosine wave in response to receiving two of the control bits; and
generating from the unsigned-sine wave and unsigned-cosine wave a sine-wave and a cosine wave in response to the control bits.

22. A circuit for generating an output sinusoidal waveform, comprising:
a first memory configured to store a first set of data representing an octant of a sinusoidal waveform;
a second memory configured to store a second set of data representing a complementary octant of the sinusoidal waveform; and
a control circuit configured to receive a multi-bit signal and construct the output sinusoidal waveform using the multi-bit signal and the first and second sets of data, wherein the multi-bit signal is provided by a phase accumulator.

23. A numerically controlled oscillator (NCO) incorporating the circuit as recited in claim 22.

24. A method for generating an output sinusoidal waveform, the method comprising:
generating a plurality of control bits and a plurality of address bits in an accumulator;
storing a first set of data representing an octant of a sinusoidal waveform;
storing a second set of data representing a complementary octant of the sinusoidal waveform;
receiving the plurality of address bits in a first order or a second order according to one of the control bits;
accessing the first and second sets of data in a first order if the address bits are received in the first order;
accessing the first and second sets of data in a second order if the address bits are received in the second order; and
using the first and second sets of data to generate the output sinusoidal waveform in response to the received control bits.

25. A numerically controlled oscillator executing the method recited in claim 24.

26. A numerically controlled oscillator (NCO) comprising:
a phase accumulator configured to generate a periodic multi-bit signal at a given frequency, wherein:
the periodic multi-bit signal includes a set of control bits and a set of address bits,
the control bits include a set of three control bits, and binary combinations of the three control bits map to octants of a periodic waveform;
a first memory configured to store an octant of the periodic waveform having a particular symmetry property;
a second memory configured to store a complementary octant of the periodic waveform; and
a control circuit, responsive to at least a portion of the phase accumulator signal and coupled to the first and second memories, the control circuit configured to access the first and second memories in parallel and construct respective first and second waveforms having the particular symmetry property at the given frequency, the first and second waveforms being one-quarter cycle out of phase with each other.

27. A multi-channel numerically controlled oscillator comprising:
a plurality of phase accumulators, each phase accumulator configured to provide an input signal at an associated frequency;
a sinusoidal waveform generating circuit having a first memory configured to store a first set of data representing an octant of a sinusoidal waveform and a second memory configured to store a second set of data representing a complementary octant of the sinusoidal waveform; the sinusoidal waveform generating circuit further configured to receive one of the input signals and generate a pair of output sinusoidal waveforms in response thereto using the received input signal and the first and second sets of data; and
a plurality of pairs of output channels;
wherein one of the plurality of pairs of output channels is selectively chosen to receive the pair of output sinusoidal waveforms.

28. A numerically controlled oscillator (NCO) comprising:
a phase accumulator configured to generate a periodic multi-bit signal at a given frequency, wherein the phase accumulator is configured to output memory addresses in a first order to a first accumulator output and in a second order to a second accumulator output;
a first memory configured to store an octant of a sinusoidal waveform;
a second memory configured to store a complementary octant of the sinusoidal waveform; and
a control circuit, responsive to at least a portion of the phase accumulator signal and coupled to the first and second memories, the control circuit configured to access the first and second memories in parallel and construct respective sine and cosine waves at the given frequency.

29. A numerically controlled oscillator (NCO) comprising:
a phase accumulator configured to generate a periodic multi-bit signal at a given frequency;
a first memory configured to store an octant of a sinusoidal waveform;
a second memory configured to store a complementary octant of the sinusoidal waveform; and
a control circuit, responsive to at least a portion of the phase accumulator signal and coupled to the first and second memories, the control circuit configured to access the first and second memories in parallel and construct respective sine and cosine waves at the given frequency, wherein the control circuit includes:
a memory address generator, responsive to a first subset of bits from the periodic multi-bit signal, configured to generate addresses for said first and second memories, said addresses providing for access in a normal sequence of increasing numerical values or access in a reverse sequence of decreasing numerical values;
an octant-selector circuit, responsive to a second subset of bits from the periodic multi-bit signal, the octant-selector circuit being connected to receive outputs from the first and second memories and configured to use one of the first and second memory outputs to construct an unsigned-sine wave and to use the other of the first and second memory outputs to construct an unsigned-cosine wave; and
a selective-negation circuit, responsive to a third subset of bits from the periodic multi-bit signal, the selective negation circuit being connected to receive the unsigned-sine wave and the unsigned-cosine wave from the octant-selector circuit and configured to generate the sine wave and the cosine wave therefrom.

* * * * *